June 18, 1963

H. L. JACKSON 3,093,923

FISHING LURE

Filed Oct. 4, 1961

Haskell Lee Jackson
INVENTOR.

BY *Clarence A. O'Brien*
*and Harvey B. Jacobson*
Attorneys

United States Patent Office 3,093,923
Patented June 18, 1963

3,093,923
FISHING LURE
Haskell Lee Jackson, 101 W. Patrick St., Marion, Ill.
Filed Oct. 4, 1961, Ser. No. 142,849
1 Claim. (Cl. 43—42.11)

This invention relates to a surface-type fishing lure of novel construction which is expressly, though not necessarily, constructed and designed for attracting and catching large mouth bass and pertains, more particularly, to a simplified combination of component parts which coact and contribute to the production of a unique lure which effectively serves the purposes for which it is intended.

It has been ascertained that an artifical lure equipped with a single fish hook, instead of treble-type hooks, is surer in performance and less likely to foul in waters laden with lily pads and weedy places. Therefore, and with a view toward better results the instant adaption utilizes a single hook trimmed with suitable hackle and providing a so-called attraction-promoting bass bug. Thus constructed, unhooking the trapped fish is simplified.

In addition to the bug a spoon or wobble plate is provided and to this end the forward end of the shank of the hook is fixed to the trailing end of the spoon in a plane with the plane of the spoon and to further the effectiveness of the overall lure a novel spinner and mounting bracket or carrier therefor is employed, the spoon providing a rigidified linking connection between the forwardly positioned spinner and the companion insect or bug.

More specifically the ready-to-use surface-type lure is characterized by a spoon having leading and trailing ends, an imitation bug embodying a fishhook and hackle cooperatively associated with said hook, the forward end of the shank of the hook being fixed to the trailing end of the spoon and disposed in a plane common with the plane of the spoon, a single spinner, and means supporting the spinner in a plane above the plane of said spoon and securing the spinner to the leading end of the spoon, said spinner being positioned and retained in line with the lengthwise median portion of said spoon.

The invention features an adapter bracket having a portion thereof fixed to and projecting forwardly from a central axial portion of the leading end of said spoon, having a terminal portion providing a shaft, the latter being positioned in a plane above the plane of the spoon and bug and in line with the median lengthwise dimension of said spoon, and a spinner mounted for free rotation on said shaft.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
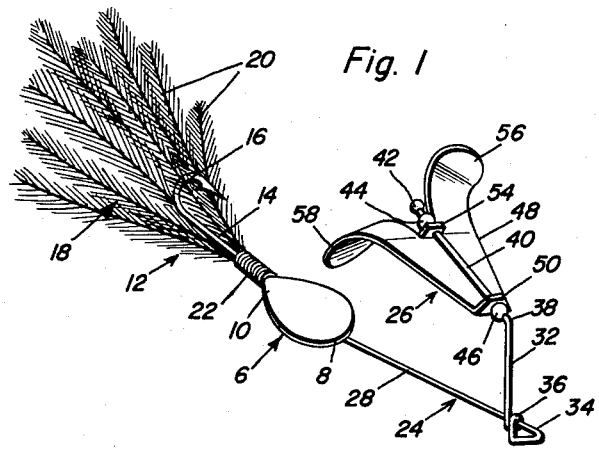
FIGURE 1 is a view in perspective of a surface-type fishing lure constructed in accordance with the present invention.
Figure 2:
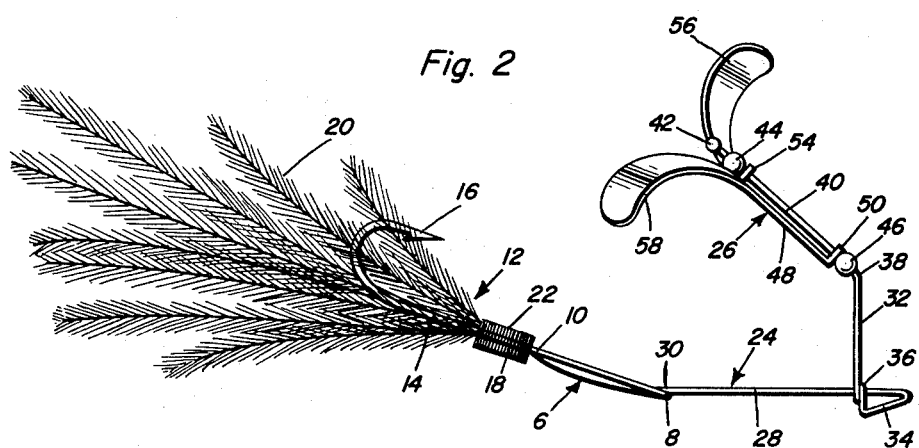
FIGURE 2 is a side elevational view of the same.
Figure 3:
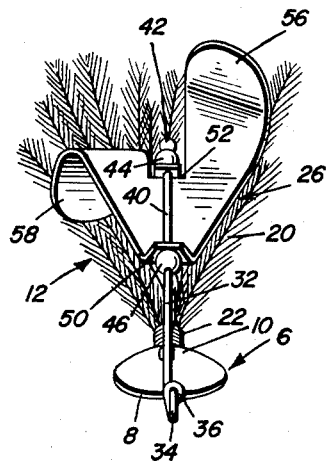
FIGURE 3 is a front end view observing the lure in a direction from right to left.

Reference will be made first to the significant spoon or wobbler plate 6. This spoon comprises a highly polished plate which is preferably ovate in plan and which may be either flat or slightly concavo-convex. The broader leading end is denoted at 8 and the narrower trailing end at 10. The imitation insect or bass bug is denoted generally by the numeral 12. It comprises a single fishhook embodying a shank 14 and an upstanding barbed hook 16. The forward end portion (FIG. 2) of the shank is rigidly connected to the median or central portion of the trailing end 10 of the spoon and is disposed in a plane substantially common with the plane of the spoon. The hook is essentially enclosed by hackle 18 or, alternatively, a bucktail the components or feathers 20 of which are gathered in the manner shown with the converging end portions surrounding the shank of the hook and tied or otherwise bound in place as at 22.

In addition to the coacting spoon and bug 18 complemental novelly constructed and arranged spinner means is provided. This means is characterized by an adapter bracket 24 which provides a carrier or mounting for the freely rotatable spinner 26. The bracket is constructed from stiff but bendable wire and embodies several arms or limbs. The first arm, designated as the horizontal arm is linearly straight and suitably elongated and is denoted at 28 and has its rearward end 30 fixedly joined to the exact central portion of the leading end 8 of the spoon. This arm projects a prerequisite distance beyond the leading end of the spoon where it is provided with a second right angularly disposed or vertical arm 32. In actual practice a single length of wire has been used and the wire is bent upon itself between its ends to join the arms 28 and 32 in a novel manner. To this end the forward or leading end portion of the arm 28 is formed to provide a return bend 34 which is then laterally bent and coiled around the arm 28 to provide a junctional connection 36 between the two arms and also a line attaching eye. The free or terminal end portion of the wire is bent at an oblique angle and connected to the upper end of arm 32 by a shoulder-forming bend or bent portion 38. This arm, also designated as a shaft 40, is of a length approximately the same as the length of the arm 28 and functions to accommodate the centrally attached freely rotatable single spinner 26. A bead or head 42 is provided on the free terminal end of the arm 40 to retain a rearwardly disposed bead 44. A second bead 46 surrounds the shaft and abuts the shoulder 38. The spinner itself comprises a substantially flat triangulate plate 48 having a laterally bent apertured lug 50 which is rotatably mounted on the shaft and abuts the bead 46. The lefthand end portion has a centralized notch 52 and an aligned apertured lug 54 which is rotatably mounted on the shaft. The lugs 50 and 54 cooperate with the freely turnable thrust beads 46 and 44 in an obvious manner. The rearward notched end portion of the spinner is provided to the left and right of the center with laterally directed curved and oppositely bent impeller blades 56 and 58 which function to turn the spinner as the lure is drawn through the water.

Experience has shown that a lure constructed in accordance with the present invention is simple, practical, easy to use and is effective in catching fish particularly bass.

It is believed that a careful consideration of the specification and claim in conjunction with the drawing will enable the reader to obtain a clear and comprehensive understanding of the construction, features and advantages and method of using the lure. Therefore a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A surface-type fishing lure comprising, in combination, an imitation bug embodying a single fishhook and hackle cooperatively associated with and carried by said hook, a spinner supporting and carrier bracket embodying a first horizontal arm, a second arm vertical to said first arm and complemental thereto and having a lower end attached to a forward end portion of the first-named arm, said arms being integrally connected to each other and the portion thereof at the junctional connection of the arms being provided with a loop constituting a line-attaching eye, a third arm coplanar with the first and second-named arms and having a forward end joined to the upper end of the second arm by way of a bent portion, the latter constituting a shoulder, said third arm constituting a shaft and being of a length approximately the same as the length of the first-named arm, a single spinner having centralized aligned lateral lugs rotatably mounted on said shaft, and a linking plate, said plate constituting a spoon and being of dished concavo-convex form, the rearward end of said first arm being rigidly connected to the forward end of said plate, and the forward end of the shank of the aforementioned hook being connected to a central rearward end of said plate, said plate being located rearwardly of the rear end portion of said spinner.

References Cited in the file of this patent

UNITED STATES PATENTS

| | | |
|---|---|---|
| 756,009 | Flegle | Mar. 29, 1904 |
| 1,731,161 | Farley | Oct. 8, 1929 |
| 1,832,768 | Davenport | Nov. 17, 1931 |
| 2,203,473 | Shannon | June 4, 1940 |
| 2,261,433 | Demory | Nov. 4, 1941 |
| 2,374,279 | Fugler | Apr. 24, 1945 |
| 2,778,144 | Jones et al. | Jan. 22, 1957 |
| 3,006,103 | Scott | Oct. 31, 1961 |
| 3,012,356 | Tyson | Dec. 12, 1961 |